(12) United States Patent
Chen

(10) Patent No.: US 6,257,677 B1
(45) Date of Patent: Jul. 10, 2001

(54) BICYCLE WHEEL RIM

(75) Inventor: Chao-Ying Chen, Tainan Hsien (TW)

(73) Assignee: Alex Machine Industrial Co., Ltd., Tainen Hsien (TW)

( * ) Notice: Subject to any disclaimer, the term of this patent is extended or adjusted under 35 U.S.C. 154(b) by 0 days.

(21) Appl. No.: 09/321,313

(22) Filed: May 27, 1999

(30) Foreign Application Priority Data

Feb. 12, 1998 (TW) .................................................. 87202013

(51) Int. Cl.$^7$ ............................. B60B 21/02; B60B 21/06
(52) U.S. Cl. ............................................. 301/95; 301/58
(58) Field of Search .................................. 301/58, 73, 95, 301/96, 97, 98, 55

(56) References Cited

U.S. PATENT DOCUMENTS

| | | | |
|---|---|---|---|
| 486,146 | * 11/1892 | Westwood et al. | 301/58 |
| 5,470,133 | * 11/1995 | Kuo et al. | 301/95 |
| 5,499,864 | * 3/1996 | Klein et al. | 301/97 X |
| 5,931,544 | * 8/1999 | Dietrich | 301/58 |
| 6,145,936 | * 11/2000 | Alberti et al. | 301/58 |

FOREIGN PATENT DOCUMENTS

| | | | | |
|---|---|---|---|---|
| 238249 | * | 6/1945 | (CH) | 301/58 |
| 687059 | * | 2/1953 | (GB) | 301/97 |
| 720304 | * | 12/1954 | (GB) | 301/58 |
| 1098032 | * | 1/1968 | (GB) | 301/97 |
| 12315 | * | 1/1985 | (JP) | 301/58 |
| 94801 | * | 5/1985 | (JP) | 301/58 |

* cited by examiner

Primary Examiner—Russell D. Stormer
(74) Attorney, Agent, or Firm—Townsend and Townsend and Crew LLP

(57) ABSTRACT

A bicycle wheel rim used for mounting a plurality of spokes thereon includes spaced left and right annular tire retaining walls adapted for retaining a bicycle tire therebetween, and an annular spoke mounting wall. Each of the tire retaining walls has an inner edge proximate to a central point of the wheel rim, and an outer edge distal to the central point of the wheel rim. The spoke mounting wall interconnects the inner edges of the tire retaining walls, and has a central bridging portion with left and right terminating edges, a left corner block which interconnects the inner edge of the left tire retaining wall and the left terminating edge of the bridging portion and which is formed with a set of left spoke fastening holes, and a right corner block which interconnects the inner edge of the right tire retaining wall and the right terminating edge of the bridging portion and which is formed with a set of right spoke fastening holes that are staggered with respect to the left spoke fastening holes.

4 Claims, 6 Drawing Sheets

BICYCLE WHEEL RIM

BACKGROUND OF THE INVENTION

1. Field of the Invention

This invention relates to a bicycle wheel rim, more particularly to a bicycle wheel rim which has an enhanced resistance to buckling and which is capable of retaining spoke fasteners fittingly thereon.

2. Description of the Related Art

Referring to FIGS. 1 and 2, a conventional bicycle wheel rim 1 is shown to include spaced left and right tire retaining walls 12 and a spoke mounting wall 11 interconnecting inner edges of the tire retaining walls 12. The spoke mounting wall 11 is formed with a plurality of spoke fastening holes 10 that are slightly staggered and that are arranged generally along a central portion of the spoke mounting wall 11 for mounting of spoke fasteners 2 thereon (see FIGS. 2 and 3). A plurality of spokes 31 are fastened to the spoke fasteners 2 for mounting the bicycle wheel rim 1 on two opposite ends of a hub 3.

Some of the drawbacks of the conventional bicycle wheel rim 1 are as follows:

1. As shown in FIGS. 2 and 3, since the spoke fastening holes 10 are arranged along the central portion of the spoke mounting wall 11 with a distance (a) between adjacent pairs of the spoke fastening holes 10, the central portion of the spoke mounting wall 11 is susceptible to deformation due to the tension force applied thereto by the spokes 31 when the bicycle wheel rim 1 is in use.

2. As shown in FIG. 2, the spoke fastener 2 typically has a shank portion 20 and an enlarged head portion 21 with a tapering neck 212 connected to the shank portion 20. The spoke fastener 2 is loosely retained on the spoke mounting wall 11 since the spoke mounting wall 11 is not provided with retaining means for retaining fittingly the spoke fastener 2 thereon. This results in difficulties during assembly of the bicycle wheel rim 1 on the hub 3 to form a bicycle wheel.

SUMMARY OF THE INVENTION

Therefore, the object of the present invention is to provide a bicycle wheel rim which has an enhanced resistance to buckling and which is capable of retaining spoke fasteners fittingly thereon.

Accordingly, the bicycle wheel rim of the present invention is used for mounting a plurality of spokes thereon, and includes spaced left and right annular tire retaining walls adapted for retaining a bicycle tire therebetween, and an annular spoke mounting wall. Each of the tire retaining walls has an inner edge proximate to a central point of the wheel rim, and an outer edge distal to the central point of the wheel rim. The spoke mounting wall interconnects the inner edges of the tire retaining walls, and has a central bridging portion with left and right terminating edges, a left corner block which interconnects the inner edge of the left tire retaining wall and the left terminating edge of the bridging portion and which is formed with a set of left spoke fastening holes, and a right corner block which interconnects the inner edge of the right tire retaining wall and the right terminating edge of the bridging portion and which is formed with a set of right spoke fastening holes that are staggered with respect to the left spoke fastening holes.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 4:
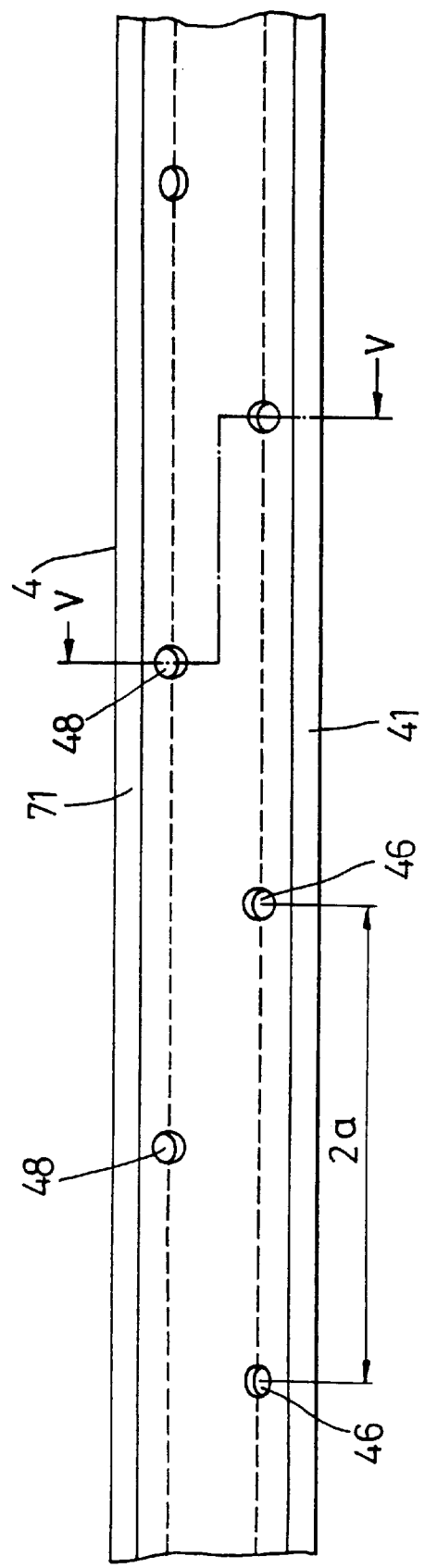
FIG. 4 is a fragmentary schematic top view illustrating first preferred embodiment of the bicycle wheel rim of the present invention.
Figure 5:
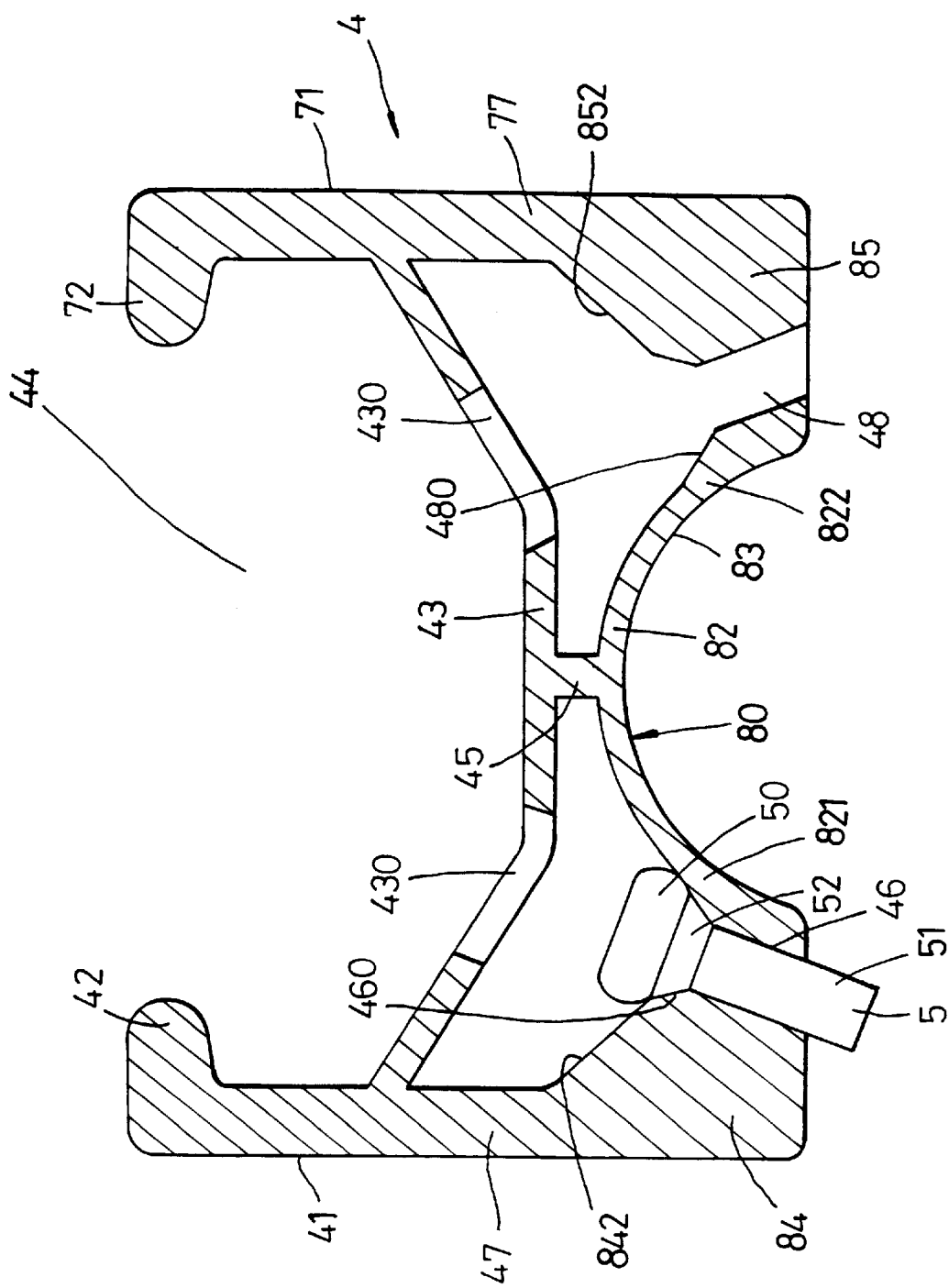
FIG. 5 is a fragmentary sectional view of the first preferred embodiment taken along line V—V in FIG. 4.

Referring to FIGS. 4 and 5, the first preferred embodiment of the bicycle wheel rim 4 of the present invention is adapted for mounting a plurality of spokes (not shown) thereon by means of spoke fasteners 5, and is shown to include spaced left and right annular tire retaining walls 41, 71, an annular spoke mounting wall 80, and an outer connecting wall 43. Each of the tire retaining walls 41, 71 has an inner edge 47, 77 proximate to a central point of the bicycle wheel rim 4, and an outer edge which is distal to the central point of the bicycle wheel rim 4 and which is formed with a tire retaining flange 42, 72 that projects toward the other one of the tire retaining walls 41, 71.

The spoke mounting wall 80 has a curved central bridging portion 82 so as to define a concave face 83 that faces the central point of the bicycle wheel rim 4. The bridging portion 82 has a left terminating edge 821 proximate to the left tire retaining wall 47, and a right terminating edge 822 proximate to the right tire retaining wall 77. The spoke mounting wall 80 further includes a left corner block 84 which interconnects the left terminating edge 821 of the bridging portion 82 and the inner edge 47 of the left tire retaining wall 41, and a right corner block 85 which interconnects the right terminating edge 822 of the bridging portion 82 and the inner edge 77 of the right tire retaining wall 71. The left corner block 84 is solid, and is formed with a set of left spoke fastening holes 46 that are arranged longitudinally along the spoke mounting wall 80. The right corner block 85 is also solid, and is formed with a set of right spoke fastening holes 48 which are staggered with respect to the left spoke fastening holes 46. Each of the left and right spoke mounting holes 46, 48 has an axis that is inclined relative to a vertical plane passing through the central point of the bicycle wheel rim 4 and a central point of the bridging portion 83 so as to permit the bicycle wheel rim 4 to be mounted on two opposite ends of a hub (not shown) by means of the spoke fasteners 5 (only one is shown) and the spokes (not shown). The left corner block 84 has a thickness that increases in a direction from the bridging portion 83 toward the left tire retaining wall 41 so as to form an inclined face 842 between the bridging portion 82 and the left tire retaining wall 41. The right corner block 85 has a thickness which increases in a direction from the bridging portion 82 toward the right tire retaining wall 71 so as to form an inclined face 852 between the bridging portion 82 and the right tire retaining wall 71.

The connecting wall 43 surrounds the spoke mounting wall 80, and interconnects the left and right tire retaining walls 41, 71. The connecting wall 43 cooperates with the tire retaining walls 41, 71 to form a tire retaining space 44 thereamong so as to be adapted to retain a bicycle tire between the tire retaining walls 41, 71. A support rib 45 transverse to the connecting wall 43 extends between the spoke mounting wall 80 and the connecting wall 43. The connecting wall 43 is formed with through holes 430 which are aligned respectively with the left and right spoke fastening holes 46, 48 to permit extension of the spoke fasteners 5 therethrough.

Since the spoke fastener 5 typically has a shank portion 51 and an enlarged head portion 50 with a tapering neck 52 connected to the shank portion 51, each of the left and right spoke fastening holes 46, 48 has a gradually converging retaining hole portion 460, 480 formed adjacent to the inclined face 842, 852, respectively. The retaining hole portion 460, 480 of each of the spoke fastening holes 46, 48 has a shape that complements the tapering neck 52 of a respective one of the spoke fasteners 5 so as to permit the head portion 50 of the respective spoke fastener 5 to be seated therein.

Figure 6:
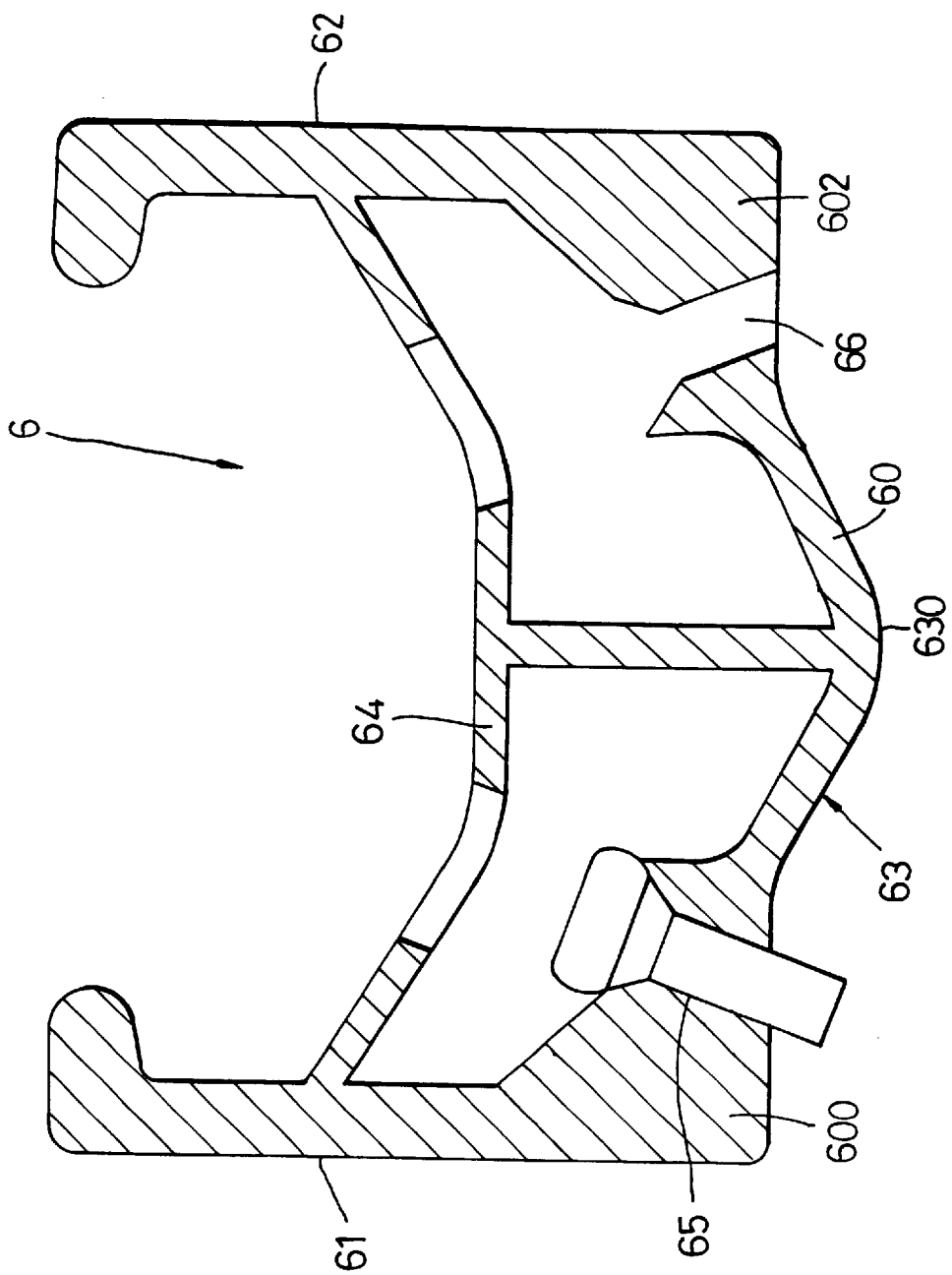
FIG. 6 is a fragmentary sectional view illustrating a second preferred embodiment of the bicycle wheel rim of the present invention.

Referring to FIG. 6, the bicycle wheel rim 6 of the second preferred embodiment according to the present invention is shown to also include spaced left and right annular tire retaining walls 61, 62, an annular spoke mounting wall 63 interconnecting inner edges of the tire retaining walls 61, 62, and an outer connecting wall 64 surrounding the spoke mounting wall 63. The spoke mounting wall 63 also has a central bridging portion 60, a left corner block 600 proximate to the left tire retaining wall 61 and formed with a set of left spoke mounting holes 65, and a right corner block 602 proximate to the right tire retaining wall 62 and formed with a set of right spoke mounting holes 66. The bicycle wheel rim 6 differs from the bicycle wheel rim 4 of the previous embodiment in that the central bridging portion 60 of the spoke mounting wall 63 is curved in a direction toward a central point of the bicycle wheel rim 6 so as to form a convex face 630 that faces the central point of the bicycle wheel rim 6 to result in reduced wind resistance when the bicycle wheel rim 6 is in use.

Figure 1:
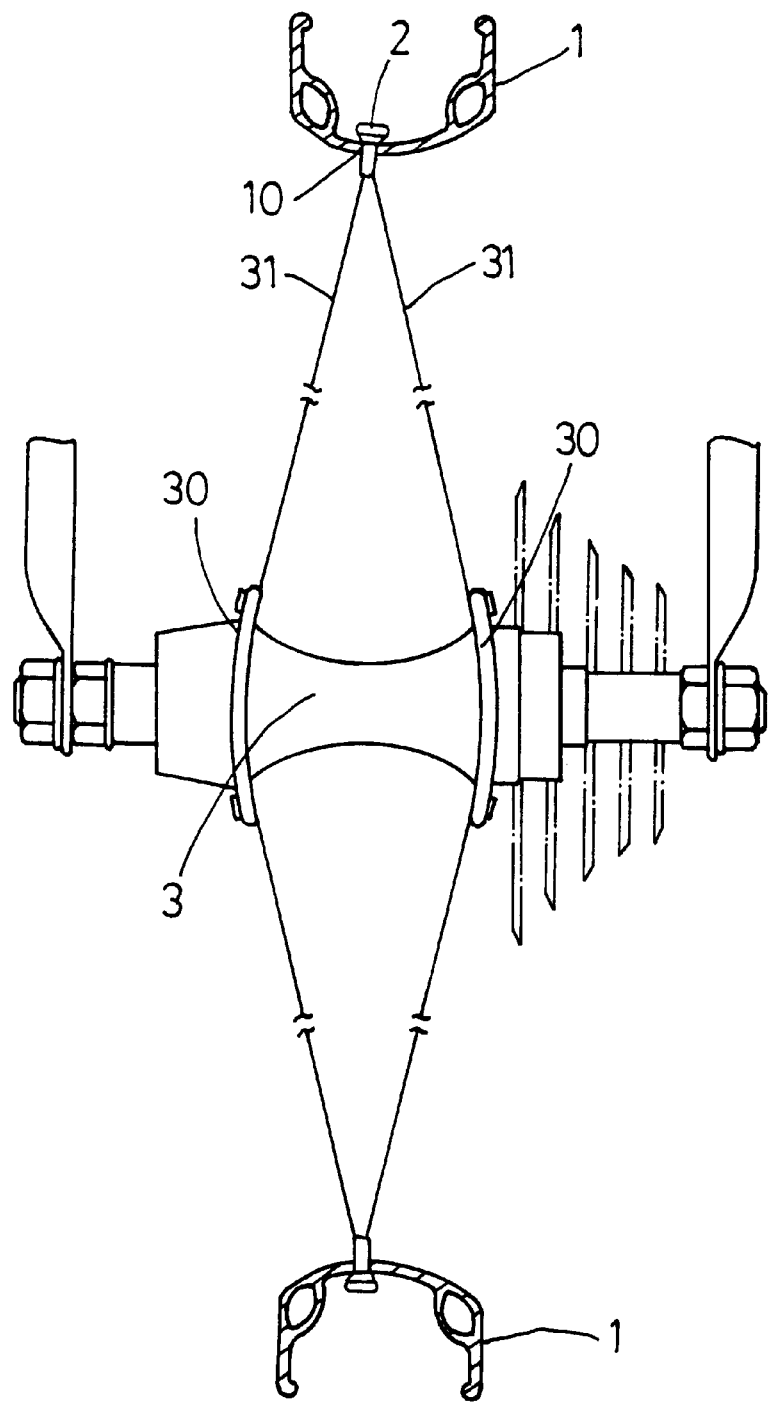
FIG. 1 is a schematic partly sectional view illustrating a conventional bicycle wheel rim when mounted on a hub to form a bicycle wheel.
Figure 2:
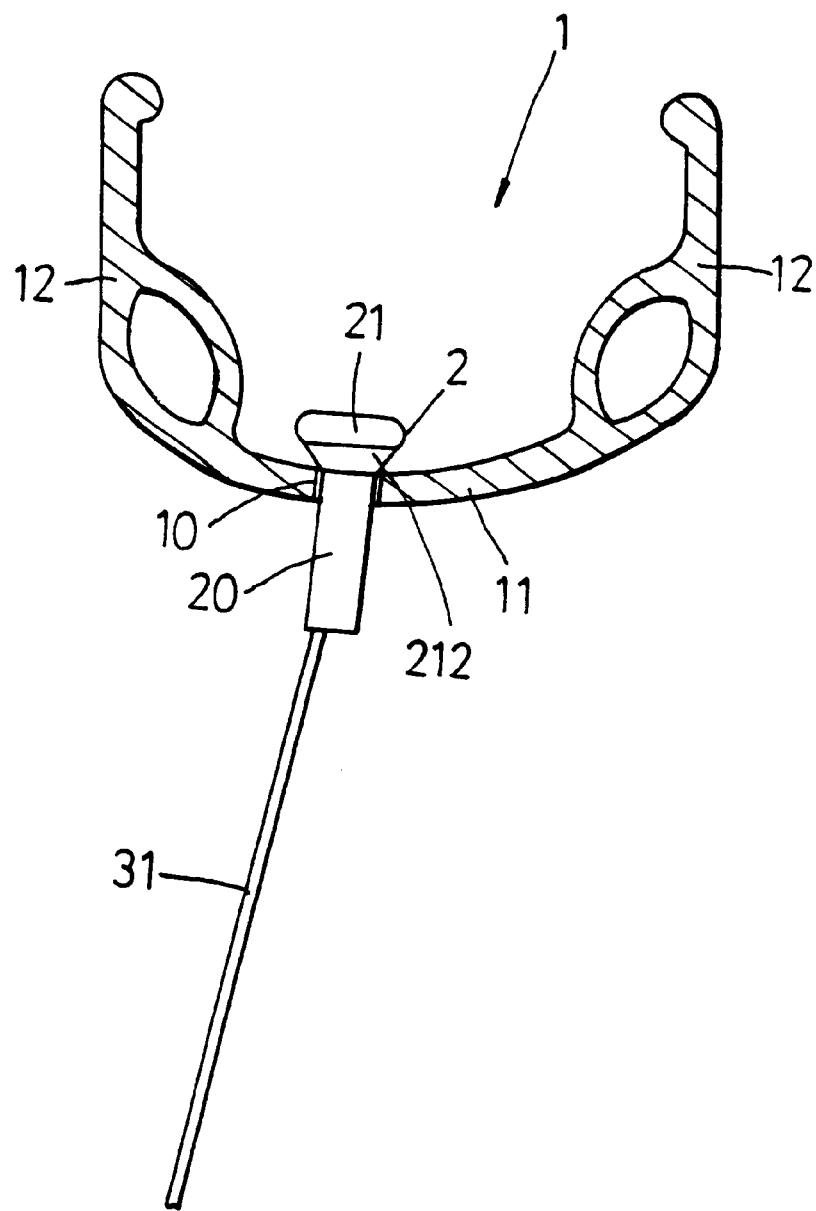
FIG. 2 is an enlarged fragmentary sectional view illustrating the conventional bicycle wheel rim.
Figure 3:
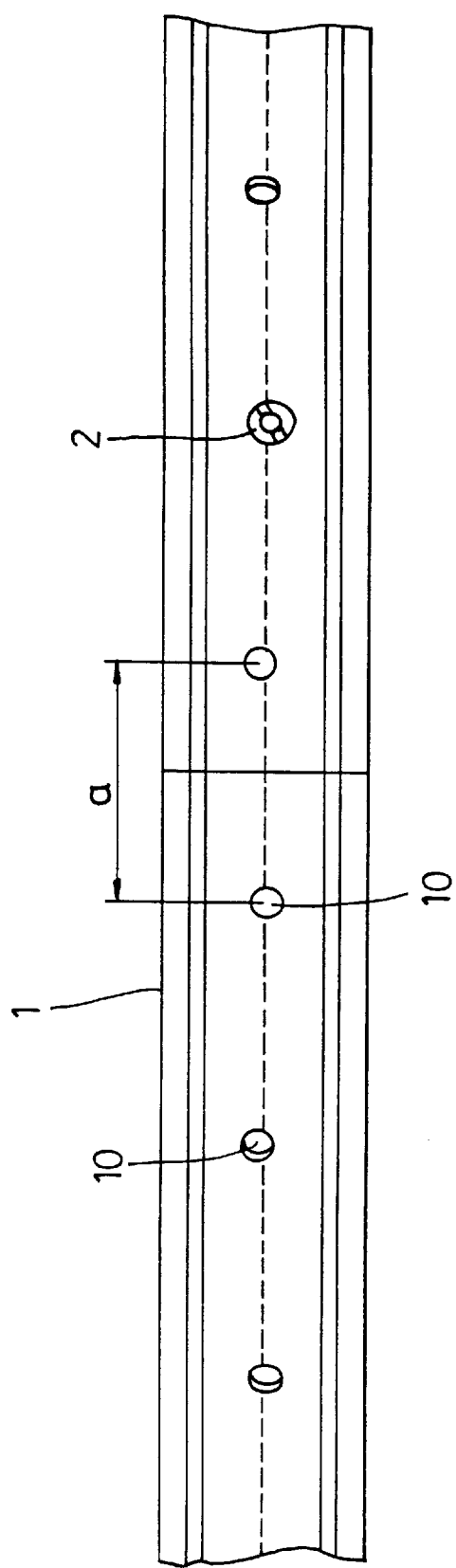
FIG. 3 is a fragmentary schematic top view illustrating the conventional bicycle wheel rim.

Referring again to FIGS. 4 and 5, since the left spoke mounting holes 46 are staggered with respect to the right spoke mounting holes 48, and since the left and right spoke mounting holes 46, 48 are formed on the left and right corner blocks 84, 85 of the spoke mounting wall 80, rather than on the central bridging portion 82, the distance between an adjacent pair of the left spoke mounting holes 46, or an adjacent pair of the right spoke mounting holes 48 is increased to (2a) as compared with the conventional bicycle wheel rim 1 shown in FIG. 3. The tension force applied to the bicycle wheel rim 4 by the spokes is thus distributed to the two corner blocks 84, 85 instead of being concentrated on the central portion of the spoke mounting wall. The bicycle wheel rim 4 is thus less susceptible to deformation. In the preferred embodiments, each of the corner blocks 84, 85, 600, 602 has an increasing thickness. As such, an enhanced rigidity is attained to resist deformation due to the tension applied by the spokes.

Moreover, with the provision of the retaining hole portions 460, 480 having shapes that complement the tapering necks 52 of the spoke fasteners 5, the spoke fasteners 5 can be received and retained fittingly in the spoke fastening holes 46, 48, 65, 66. This facilitates assembly of the bicycle wheel rim 4, 6 to a hub to form a bicycle wheel.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle wheel rim for mounting a plurality of spokes thereon, comprising:

spaced left and right annular tire retaining walls adapted for retaining a bicycle tire therebetween, each of said tire retaining walls having an inner edge proximate to a central point of said wheel rim, and an outer edge distal to the central point of said wheel rim; and an annular spoke mounting wall interconnecting said inner edges of said tire retaining walls, said spoke mounting wall having a central bridging portion with left and right terminating edges, a left corner block which interconnects said inner edge of said left tire retaining wall and said left terminating edge of said bridging portion and which is formed with a set of left spoke fastening holes, and a right corner block which interconnects said inner edge of said right tire retaining wall and said right terminating edge of said bridging portion and which is formed with a set of right spoke fastening holes that are staggered with respect to said left spoke fastening holes.

2. The bicycle wheel rim as claimed in claim 1, wherein each of said left and right corner blocks has a thickness that increases in a direction from said bridging portion toward a respective one of said left and right tire retaining walls.

3. The bicycle wheel rim as claimed in claim 1, the spokes being fastened to said bicycle wheel rim by spoke fasteners with enlarged head portions, wherein each of said spoke fastening holes has a retaining hole portion with a cross-section that complements the head portions of the spoke fasteners so as to be adapted to seat the head portion of a respective one of the spoke fasteners in said retaining hole portion.

4. A bicycle wheel rim as claimed in claim 1, further comprising:

an outer connecting wall which surrounds said spoke mounting wall and which interconnects said left and right tire retaining walls, said connecting wall cooperating with said tire retaining walls to form a tire retaining space thereamong as to be adapted to retain the bicycle tire between said tire retaining walls, said connecting walls being formed with through holes that are aligned respectively with said left and right spoke fastening holes so as to be adapted to permit extension of spoke fasteners therethrough; and a support rib transverse to said connecting wall and extending between said spoke mounting wall and said connecting wall.

* * * * *